Nov. 17, 1931.   J. F. SCHULTZ   1,832,053
WAGON HITCH
Filed May 13, 1930
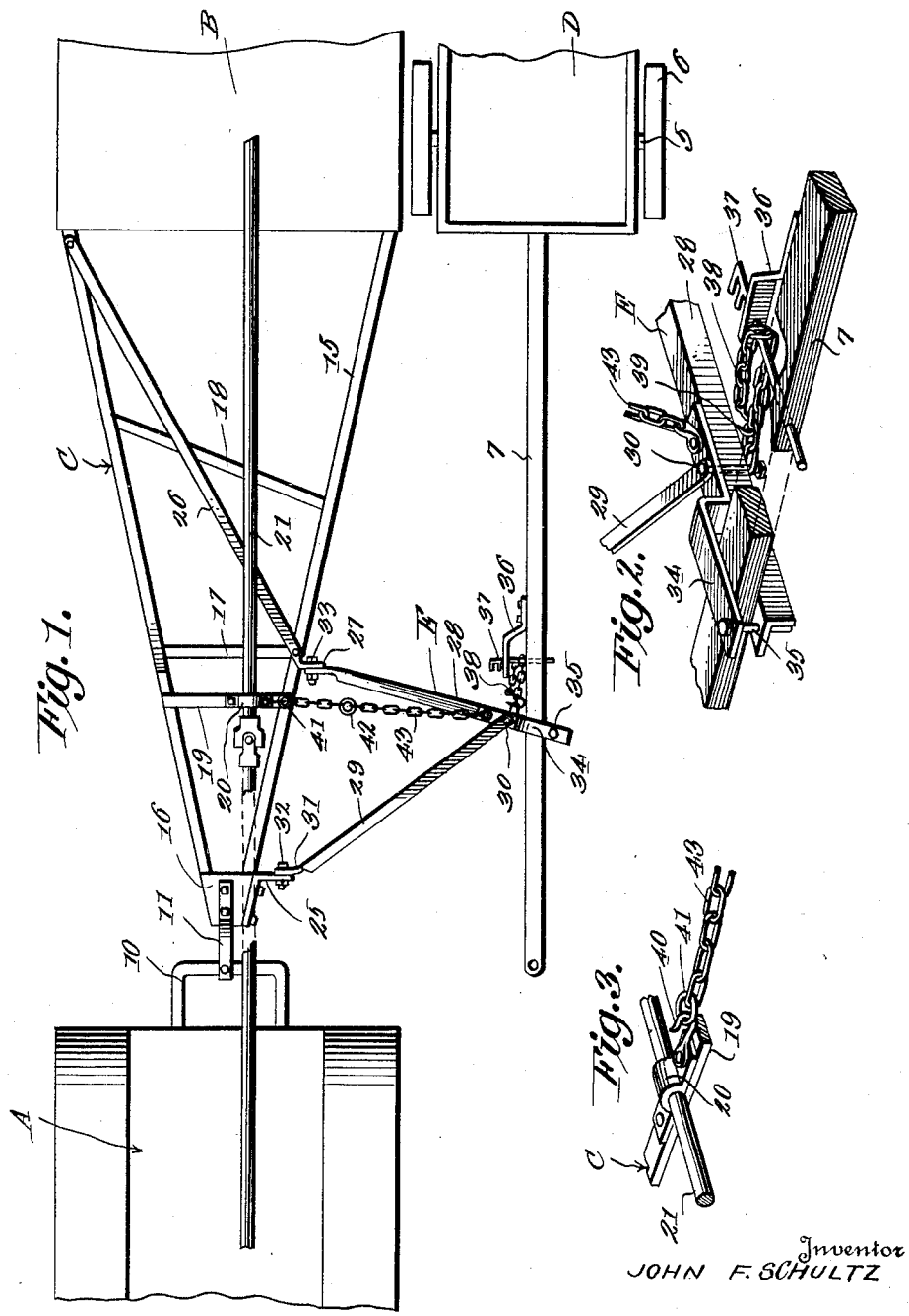
Inventor
JOHN F. SCHULTZ Patented Nov. 17, 1931

1,832,053

UNITED STATES PATENT OFFICE

JOHN F. SCHULTZ, OF ASHKUM, ILLINOIS, ASSIGNOR OF ONE-HALF TO EMORY H. HARFORD, OF PIPER CITY, ILLINOIS

WAGON HITCH

Application filed May 13, 1930. Serial No. 451,997.

This invention appertains to hitches and more particularly to means for connecting a trailer wagon with a tractor and corn picker.

It has heretofore been proposed to draw a wagon along the side of a corn picker for receiving the picked corn therefrom and of connecting the wagon with the tractor or picker by means of a hitch, but with all such hitches, as far as I am aware, difficulty is encountered in connecting the same to and detaching the same from the wagon and wagon tongue and the hitch part when detached from the wagon falls and drags upon the ground.

It is therefore one of the primary objects of the invention to provide a strong and rigid wagon hitch for tractor and corn pickers which is connected solely to the tongue of the wagon and which can be quickly and easily connected thereto or detached therefrom.

Another salient object of the invention is the provision of a hitch for connecting a wagon with a tractor and corn picker in which the wagon tongue engaging portion of the hitch is connected to the tractor at all times and which can be swung and held in a raised position out of engagement with the ground after the same has been detached from the wagon tongue.

A still further object of our invention is to provide an improved hitch of the above character, which will be durable and efficient in use, one that will be simple and easy to manufacture and embody a minimum number of parts and one which can be readily incorporated with the ordinary hitch between the tractor and corn picker at an extremely low cost.

With these and other objects in view, the invention consists in the novel construction, arrangement and formation of parts, as will be hereinafter more specifically described, claimed, and illustrated in the accompanying drawings, in which drawings:—

Figure 1 is a top plan view showing my improved wagon hitch in operative position.

Figure 2 is a fragmentary perspective view illustrating the novel means employed for connecting the wagon hitch to the wagon tongue.

Figure 3 is a detail fragmentary perspective view illustrating the means for connecting the holding chain for the hitch to the bearing of the power takeoff shaft.

Referring to the drawings in detail, wherein similar reference characters designate corresponding parts throughout the several views, the letter A generally indicates a tractor which can be of any preferred or conventional character or make, B a corn picker which likewise can be of any preferred character or make, and C the usual hitch employed for connecting the tractor A with the corn picker B. A wagon D is placed along the side of the corn picker B for receiving the corn picked therefrom and in order to draw the wagon D from the tractor I employ my novel hitch E which will be later described. The wagon D can be of the ordinary or any preferred type including the front swinging axle 5 for the wheels 6 and the forwardly extending tongue 7 which is connected with the swinging axle in the usual way.

The tractor A is provided with any preferred type of draw bar 10, to which the conventional hitch C is connected by a clevis 11.

As stated the hitch C is of the usual or conventional construction and is preferably made from structural iron and includes the longitudinally extending side rails 15 formed of angle iron which gradually converge toward their forward ends, and are bolted to a head 16 of sheet metal. The rear ends of the longitudinally extending beams 15 are bolted or otherwise secured to the corn picker B adjacent to the opposite sides thereof. This hitch is braced in any preferred way such as by transverse and diagonal brace beams 17 and 18. This hitch also embodies an upright bridge strap 19 which supports a bearing 20 for the power take-off shaft 21 leading from the tractor back to the corn picker mechanism.

In accordance with my invention, I employ an angle bracket 25, which is bolted or riveted to one side of the head 16 adjacent to the draw bar 1 of the tractor A. Adjacent to the rear end of the conventional hitch C, I place a diagonally extending brace or connecting bar 26 which can be formed of angle iron. This brace 26 is connected at its rear end to the rear end of one longitudinally extending bar 15 and extends forwardly and diagonally therefrom across the other longitudinally extending bar and is bolted thereto. The forward end of the angle bar 26 has formed thereon a laterally extending foot 27 for a purpose, which will be later described. My improved hitch E comprises a transversely extending lift beam 28 preferably formed from angle iron and a forwardly and inwardly extending draw beam 29 which is likewise preferably formed of angle iron. The beam 29 is connected at its rear end adjacent to the outer end of the lift beam 28 by suitable bolts or other fastening elements 30. The forward inner end of the draw beam 29 of the hitch is provided with a laterally extending foot 31 which is connected with the angle bracket 25 by means of a pivot bolt 32. The inner end of the lift beam 28 is connected to the laterally extending foot 27 by the use of suitable pivot bolts or the like 33. Bolted or otherwise secured to the upper face of the lift beam 28 is a connecting bracket 34 which forms in connection with the outer end of said lift beam a yoke for receiving the tongue 7 of the wagon and a suitable pin or bolt 35 extends through the end of the lift beam 28 and the bracket 34 for connecting said lift beam with the tongue. Directly in rear of the point of connection of the lift beam 28 with the tongue 7, the tongue 7 has riveted or otherwise secured thereto an angle bracket 36, a portion of which extends in spaced parallel relation to the tongue, and the bracket and tongue is provided with registering openings for the reception of a removable pin or key 37. A chain 38 is bolted or otherwise secured to the lift beam 28 and can be placed around the pin or key 37 and the end of this chain carries a hook 39 which can be placed in any link of the chain for connecting the said lift bar and draw beam 29 with the tongue.

Connected with the bearing 20 or its supporting cross beam 19 is a hook 40 over which is adapted to be placed either the ring 41 or the ring 42 carried by a supporting chain 43. The ring 41 is carried by the inner end of the chain while the ring 42 is placed in the chain intermediate the length thereof.

In use of my improved hitch the same is connected with the usual hitch C in the manner described by means of pivots 32 and 33 and the chain 43 and it is merely necessary to place the tongue 7 in the yoke and the chain 38 around the pin 37. This will effectively draw the wagon D along side of the corn picker C and owing to the direct connection of the hitch E with the tongue 7 the wagon will be steered with the tractor. When the wagon D is full of the picked corn it is merely necessary to unhook the chain 38 and remove the bolt 35 and swing the tongue 7 out of the yoke. The ring 42 can now be placed over the hook 40 which will hold the hitch E in a raised position on its pivots 32 and 33. The draft animals can now be hooked to the filled wagon and an empty wagon can be readily connected to the hitch.

From the foregoing description, it can be seen that I have provided an exceptionally simple and rugged hitch which will permit the effective connecting of a barge or wagon with a tractor and a corn picker, the hitch being of such character as to permit the ready association thereof with a conventional hitch between the tractor and corn picker.

Changes in details may be made without departing from the spirit or the scope of this invention, but:—

What I claim as new is:

The combination with a wagon, a tractor, a corn picker for delivering the picked corn to the wagon, a hitch for connecting the tractor to the corn picker, of a hitch for connecting the wagon to the first mentioned hitch comprising a transversely extending lift beam and a forwardly and inwardly extending draw beam, means pivotally connecting the inner ends of the draw beam and lift beam to the first mentioned hitch, a yoke formed on the outer end of the lift beam for receiving the tongue of the wagon, a detachable pin carried by the tongue of the wagon, a chain connected with the lift and draw beam for engagement with said pin carried by the tongue of the wagon, a hook connected with the first mentioned hitch, and a chain having rings at spaced points for selective engagement with the hook.

In testimony whereof I affix my signature.

JOHN F. SCHULTZ.